B. R. VAN KIRK.
CAR TRUCK.
APPLICATION FILED JUNE 9, 1911.

1,060,517.

Patented Apr. 29, 1913.
2 SHEETS—SHEET 1.

Witnesses
Walter Chien
Wills A. Burrows

Inventor:—
Benjamin R. Van Kirk.
by his Attorneys
Howson & Howson

B. R. VAN KIRK.
CAR TRUCK.
APPLICATION FILED JUNE 9, 1911.
1,060,517.
Patented Apr. 29, 1913.
2 SHEETS—SHEET 2.
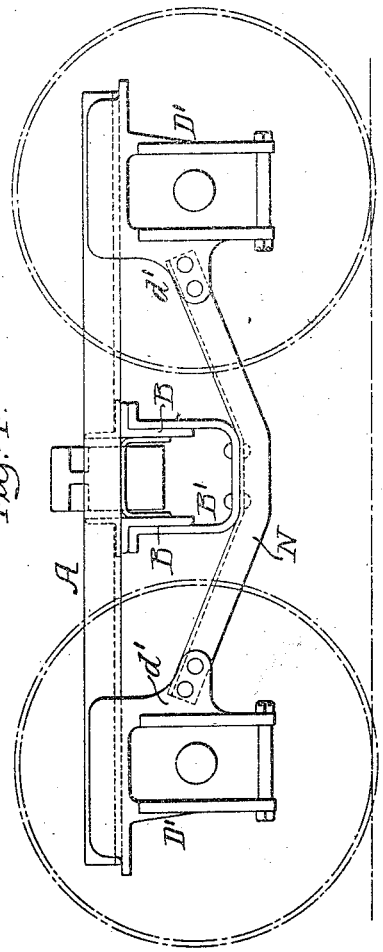
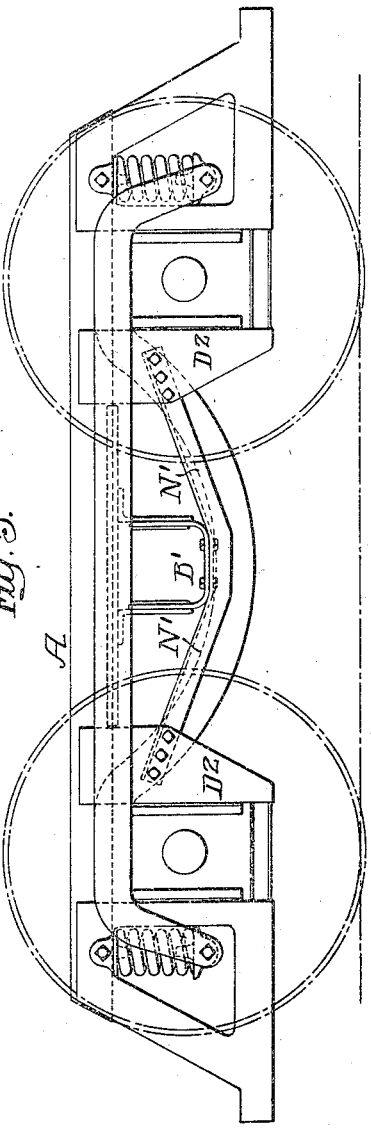
Witnesses—
Walter Chism
Wills A Burrows
Inventor.—
Benjamin R. Van Kirk.
by his Attorneys:—

UNITED STATES PATENT OFFICE.

BENJAMIN R. VAN KIRK, OF PHILADELPHIA, PENNSYLVANIA, ASSIGNOR, BY MESNE ASSIGNMENTS, TO THE BALDWIN LOCOMOTIVE WORKS, OF PHILADELPHIA, PENNSYLVANIA, A CORPORATION OF PENNSYLVANIA.

CAR-TRUCK.

1,060,517.

Specification of Letters Patent. Patented Apr. 29, 1913.

Application filed June 9, 1911. Serial No. 632,151.

*To all whom it may concern:*

Be it known that I, BENJAMIN R. VAN KIRK, a citizen of the United States, residing in Philadelphia, Pennsylvania, have invented certain Improvements in Car-Trucks, of which the following is a specification.

The object of my invention is to construct a car truck which will be light and substantial; and to provide a comparatively open space between the pedestals at each side of the truck. This object I attain by substituting a single, short, angle brace for the usual long angle brace which is attached to the upper bar of the truck or extends over the boxes, and the lower brace, which is usually coupled to the two inner pedestals.

Figure 1:
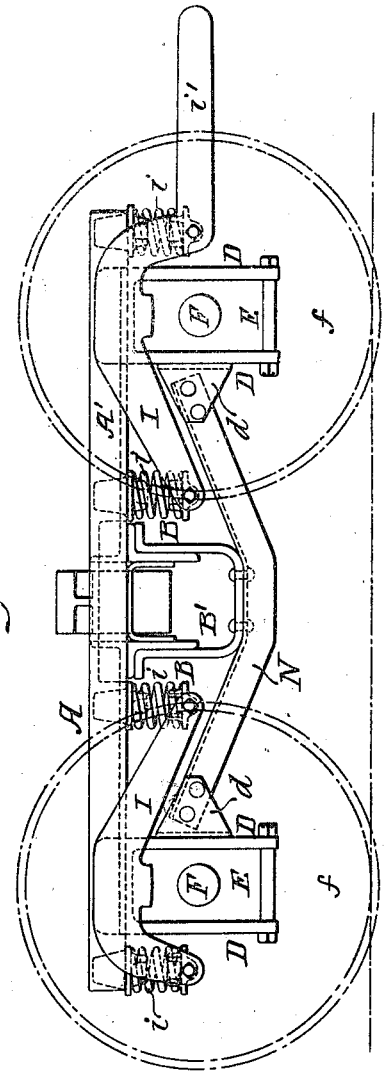
Figure 2:
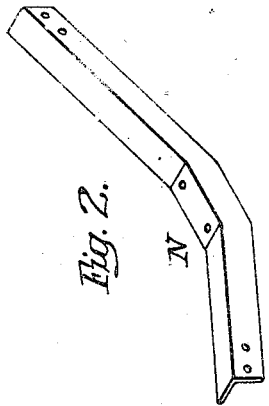
Figure 3:

In the accompanying drawings:—Figure 1, is a side view of a truck; Fig. 2, is a perspective view of the angle brace; Fig. 3, is a perspective view of one of the angle brackets to which the angle brace is secured; Figs. 4 and 5 are side views of other types of trucks embodying my invention.

A is the side frame of the truck.

B are the transoms of the usual type and B′ is a U-shaped frame connecting the transoms, as clearly shown in Fig. 1.

A′ is the upper side member of the frame, consisting of a bar, which extends the full length of the truck and D are the pedestals in which are mounted the boxes E for the axles F, on which are the wheels f.

I are two pairs of beams resting on the axle boxes E and mounted between the ends of these beams and the frame A are springs i. One pair of these beams is extended, as at i′, to form an outer support for a motor carried by one of the axles. This construction forms no part of my present invention.

N is an angle brace which extends from one inner pedestal D to the other and under the U-shaped frame B′ at the center of the truck. This angle brace is secured to the frame B′ by bolts or nuts and is also attached to extensions d projecting from the inner pedestals D—D. These extensions d are in the form of angle brackets, as clearly shown in Fig. 3, and are secured in the present instance, by rivets to the pedestals D and are also connected by rivets to the angle-brace N. Thus making a very rigid connection and yet giving a comparatively light appearance to the truck; and providing a clear space so that access may be had to the brakes and other portions of the truck.

In Fig. 4, I have illustrated a modification showing another type of truck, in which the pedestals are in the form of castings D′ and the brackets d′ are cast integral with the pedestal; otherwise the construction is the same as in Fig. 1.

In Fig. 5, I have illustrated a form of truck in which the inner pedestals $D^2$ are made of two plates spaced apart and the brace N′, in this instance, extends between the plates of the inner pedestals and is secured thereto by bolts or rivets, as shown, making a very substantial construction.

I claim:

1. The combination, in a car truck, of a side frame comprising a top bar and two sets of pedestals depending therefrom; a transom frame, and a separate continuous brace extending at an angle between the pedestals to and under the transom frame, said brace being attached to the respective pedestals at a point below the top bar.

2. The combination in a car truck, of side frames having a top bar and two sets of depending pedestals; boxes mounted between the pedestals; transoms extending from one side frame to the other; a frame connecting the lower ends of the transoms at each side frame; with a single brace arranged at an angle and extending under the said connecting frame only to the pedestals and attached to said pedestals at a point below the top bar, providing a clear space under the said brace and between the pedestals.

3. The combination in a car truck, of side frames; a pair of transoms connecting the side frames, frames connecting the lower ends of said transoms at the side frames, each side frame consisting of a top bar and two sets of depending pedestals; a bracket secured to the inner side of each pedestal; and diagonal braces extending under the central connecting frame and attached to the brackets projecting from the pedestals.

In testimony whereof, I have signed my name to this specification, in the presence of two subscribing witnesses.

BENJAMIN R. VAN KIRK.

Witnesses:
LOUIS H. BENDER,
J. H. KERST.